(No Model.)
M. COX.
SAWMILL CARRIAGE.
No. 528,287. Patented Oct. 30, 1894.
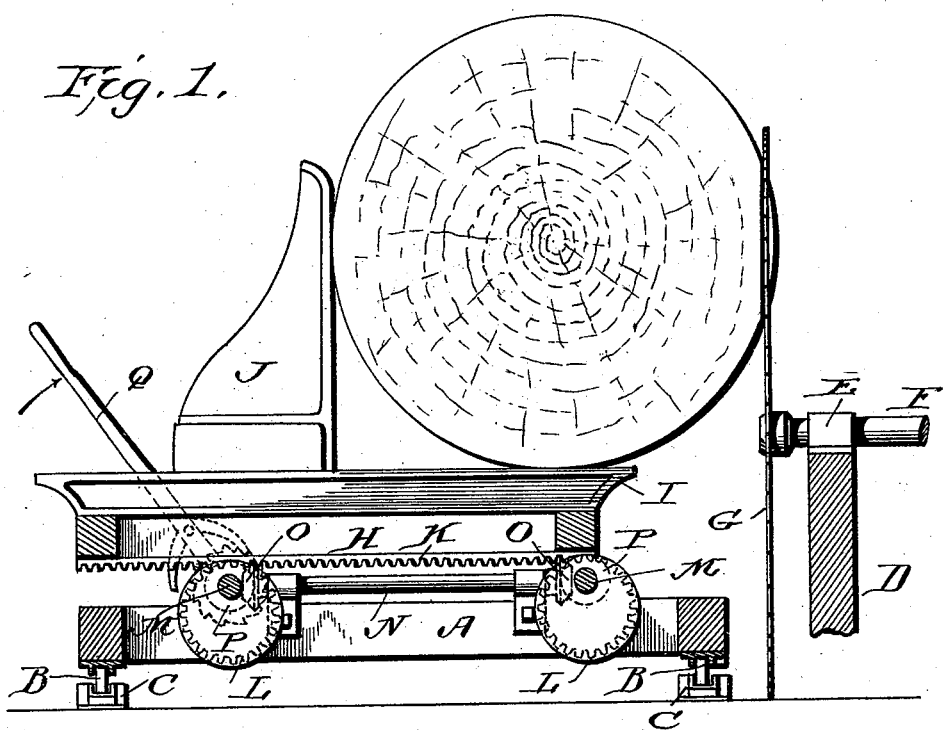
Fig. 1.
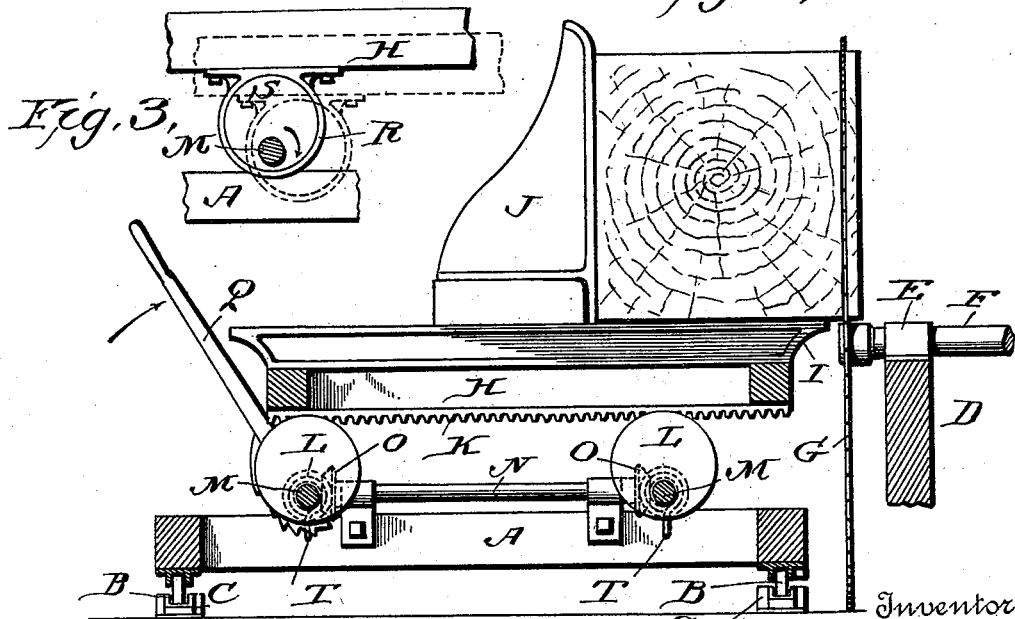
Fig. 2.
Fig. 3.
Witnesses
Inventor
Mat Cox
per Rheso G. DuBoir
Attorney.

UNITED STATES PATENT OFFICE.

MAT COX, OF HALE'S POINT, TENNESSEE.

SAWMILL-CARRIAGE.

SPECIFICATION forming part of Letters Patent No. 528,287, dated October 30, 1894.

Application filed April 13, 1894. Serial No. 507,457. (No model.)

*To all whom it may concern:*

Be it known that I, MAT COX, a citizen of the United States, residing at Hale's Point, in the county of Lauderdale and State of Tennessee, have invented certain new and useful Improvements in Sawmill-Carriages; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to certain new and useful improvements in saw mills, and more especially in the carriages used in connection therewith, for the purpose of pushing the log up to the saw.

The difficulty heretofore experienced in the squaring of logs, and more especially of large ones, is that owing to the circular contour of the log the greater part of it extends considerably above the axis of the saw, and consequently when the log is presented to the saw only the upper part of the saw will come into contact with it, and the log being a large one, the saw cuts through only a part of the way, thereby necessitating either the use of very large saws or the utilization of two saws, the one above and the other below, and both operating in the same vertical plane and upon the log at one and the same time.

The object I have in view is to provide a carriage of such construction that logs of a size above the ordinary can nevertheless be squared by the use of a single saw, of the usual diameter, thus entirely dispensing with the necessity for the use of an upper saw; not only saving the cost thereof, but obviating one of the most troublesome duties of saw milling, that is to say the keeping of the upper saw in exact and proper relation to the lower saw and frame so that the two saws will cut in exactly the same vertical plane.

In the accompanying drawings forming a part hereof Figure 1, shows one end of my improved saw carriage, in its lowest position, with a log resting thereon. Fig. 2, is a similar view showing a carriage with a square log resting thereon, the carriage in this instance being in its highest position, and Fig. 3, is a detail view of a modified form of construction.

The letter A represents the lower carriage frame provided with rollers B running in the guides or tracks C, resting upon the floor of the building or upon the ground, as the case may be. These tracks extend in a direction corresponding to that in which the saw moves and are laid close up to it.

The letter D indicates a portion of a block or frame on the upper end of which in the bearing E is mounted the shaft or mandrel F carrying the circular saw G, the operation of which will hereinafter be more fully described.

The letter H refers to the upper frame constructed of any suitable material, provided with the edge I, so constructed as to overhang and almost touch the saw. Mounted upon this frame I locate one or more knees or head blocks J, in the usual or any suitable manner, and supply it with mechanism such as is necessary for the proper working thereof, but which is not shown as it forms no part of this invention. The lower or bottom side of each end of the upper frame I provide with a rack bar K, constructed to engage the corresponding teeth upon the peripheries of the eccentries L—L mounted upon the longitudinal shafts M, extending at right angles thereto on the lower frame.

Mounted upon the transverse shaft N are the miter wheels O, constructed to engage with the corresponding miter wheels P, mounted on the longitudinal shafts M, the purpose of which is to impart motion from the one eccentric to the other, action being given to them by means of the lever Q loosely mounted on one of the shafts M, this lever being provided with pawls for engagement with a ratchet wheel R, carried by one of said shafts.

The operation of my device is as follows: The log carrying frame being at the usual level as shown in Fig. 2 by means of the lever Q, through the medium of the pawl and ratchet, the miter wheels, and the eccentrics just described I lower the frame to the position shown in Fig. 1, so that the frame instead of being on a level with the shaft F, is at a point below it.

As ordinarily constructed the log carrying frame is on a level or rather a little above the level of the axis of the shaft, so that nearly the entire one-half of the diameter of the saw is at work, when in operation, but in presenting a large log for the saw to operate upon only the extreme upper portion of the saw can work upon the log. As represented in Fig. 1, however, it will be seen that by my device I am enabled to so lower the carriage as to bring the edge of the log where the saw enters, to a point almost level to the axis of the saw, and in this way am able to utilize nearly the entire upper half of the diameter thereof.

When I have squared the log through my improved mechanism, I then raise the frame to the position shown in Fig. 2, and am in a position to do work such as is ordinarily done with the machines now in use.

In Fig. 3, I show a modified form of eccentric, the same consisting in this instance of the collar R, attached to the frame in any suitable and convenient manner, within which revolves the eccentric S. With this form of construction I am enabled to entirely do away with the rack bar and the toothed eccentrics as heretofore described, and I sometimes find it more desirable to construct my machines in this manner, as it is cheaper, though the machines are not quite so positive in their action in the handling of very large logs.

As observed in Fig. 2, I provide spiral springs T which are fastened at one end to the lower frame, encircling the shafts M and are attached at their other ends thereto, the purpose of which is to prevent a sudden jar to the frame when the pawl is freed from its engagement to the ratchet, and the upper frame is lowered. The tension of the springs is increased the lower the upper frame falls, so that by the time it reaches the lower frame it descends gently upon it and has no injurious effect which might be the case were these springs not interposed, and the upper frame should descend suddenly and instantly upon the lower frame. The springs being at their greatest tension when the upper frame has reached its lowest position, will also exert a considerable force and materially assist in the operation of raising the upper frame, after the log has been squared.

It will be observed that by doing away with the upper saw which now has to be used in cutting large logs, as set out in the beginning of this specification, I gain a great advantage, and the saving of considerable expense, to say nothing of the labor necessary to maintain the two saws in proper relation to each other, and further than this, by having the cut close down to the center of the saw the grain of the timber will have very much less effect in leading the saw out of line.

Another advantage, and a great one, gained by doing away with the upper saw is that all the cutting being done with one saw, the boards will be of uniform thickness, and the lumber can be sold as first class, whereas in many cases now by reason of the present arrangement of the upper and lower saws, should they not be in proper alignment, there is a difference in the cut between the upper and lower sides of the board, and the lumber will sell only as seconds.

I do not wish to be understood as limiting myself to the exact construction herein shown and described, as it is evident that it is within the province of a mechanic skilled in the art to which this invention appertains to somewhat vary the device above set forth in many minor particulars without departing from the spirit of my invention.

Having thus fully described my invention, what I claim as new, and desire to secure by Letters Patent, is—

1. In a log carriage, the combination with the main frame, of a supplemental frame carrying the log, positive connections between the main and supplemental frames, and means for actuating the said connections for simultaneously lifting the supplemental frame and carrying it to the saw, substantially as described.

2. In a log carriage, the combination with the main frame, of eccentrics carried by one of the said frames and having positive connection with the other frame, and means for actuating the said eccentrics whereby the said supplemental frame is simultaneously raised or lowered and moved to and from the saw, substantially as described.

3. In a log carriage, the combination of main and supplemental frames, rack bars carried by one of the frames, toothed eccentrics provided on the other frame and meshing with the said rack bars, and means for actuating the eccentrics to simultaneously raise or lower and move the supplemental frame to or from the saw, substantially as described.

4. In combination a main frame adapted to travel in a line parallel with the plane of the saw, shafts journaled upon the frame in parallel relation with each other and the line of travel of the said frame, toothed eccentrics and miter gear wheels mounted upon the shafts, a transverse shaft having bevel gear wheels meshing with the bevel gear wheels on the said shafts, a ratchet wheel and lever mounted upon one of the shafts, a supplemental frame carrying the log and rack bars on the supplemental frame meshing with the toothed eccentrics, substantially as and for the purpose described.

5. In a log carriage, the combination of main and supplemental frames, shafts journaled upon one of the frames, eccentrics mounted upon the said shafts and having positive connection with the opposing frame, and coil springs encircling the shafts and having one end connected therewith and the other end with the frame carrying the said shafts, whereby the movements of the vertically movable frame are regulated and the weight of the log partially compensated, substantially as described.

In testimony whereof I affix my signature in presence of two witnesses.

MAT COX.

Witnesses:
L. N. MICHELL,
B. O. MICHELL.